(12) United States Patent
Huver et al.

(10) Patent No.: US 6,262,205 B1
(45) Date of Patent: *Jul. 17, 2001

(54) RADICAL-POLYMERIZABLE MULTICOMPONENT MIXTURES STORABLE IN THE ABSENCE OF AIR AND THEIR USE

(75) Inventors: Thomas Huver; Thomas Moeller, both of Duesseldorf; Wolfgang Klauck, Meerbusch; Christian Nicolaisen, Hannover, all of (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/890,604

(22) PCT Filed: Dec. 21, 1990

(86) PCT No.: PCT/EP90/02286

§ 371 Date: Jul. 13, 1992

§ 102(e) Date: Jul. 13, 1992

(87) PCT Pub. No.: WO91/10687

PCT Pub. Date: Jul. 25, 1991

(30) Foreign Application Priority Data

Jan. 12, 1990 (DE) .................................................. 40 00 776

(51) Int. Cl.[7] ...................................................... C08F 4/04
(52) U.S. Cl. ......................... 526/219.1; 526/90; 526/208; 526/219.2; 526/328.5; 526/329.2; 526/329.3; 526/341; 526/342; 526/346; 526/347
(58) Field of Search ..................................... 526/219.2, 90, 526/208, 328.5, 219.1, 329.2, 329.7, 341, 342, 346, 347

(56) References Cited

U.S. PATENT DOCUMENTS

| | | | | |
|---|---|---|---|---|
| 2,601,293 | * | 6/1952 | Howard, Jr. | 260/63 |
| 3,630,962 | | 12/1971 | Stapfer | 252/431 |
| 3,988,507 | * | 10/1976 | Gruber et al. | 526/328 |
| 4,010,152 | | 3/1977 | MacLeay et al. | 260/192 |
| 4,063,012 | | 12/1977 | MacLeay et al. | 526/219 |
| 4,112,146 | * | 9/1978 | Lazear | 427/54 |

OTHER PUBLICATIONS

Ency. der technischen Chemie, Ullmann, vol. 23, 4th ed., 1983, pp. 421–423.
Ber. 84, R. Criegee et al., 1951, pp. 219–224.
Ber. 47, M. Busch et al., 1914, pp. 3277–3291.
J. Chem. Soc., K. H. Pausacher, 1950, pp.3478–3481.
Makromol. Chem. 1, W. Kern, 1947, pp. 249–267.
"Methoden der organischen Chemie", Houben–Weyl, vol. 14/1, 263–297.
Angew Makromol. Chem. 9, C. Srna, 1969, pp. 165–181.
Methoden der organischen Chem., Houben–Weyl, vol. X/2, pp. 410–487.
Chemical Abstract, vol. 83, 1975, p. 46 #98578f and #98579g.
Chemical Abstract, vol. 83, 1975, p. 104 #60654q.

* cited by examiner

*Primary Examiner*—Bernard Lipman
(74) *Attorney, Agent, or Firm*—Wayne C. Jaeschke; Stephen D. Harper

(57) ABSTRACT

The process of curing a radical-polymerizable multicomponent mixture containing an olefinically-unsaturated compound with ambient air by adding to the mixture an alkyl, cycloalkyl or aryl hydrazone of an aliphatic, cycloaliphatic or aromatic aldehyde or ketone which forms a hydroperoxide as an initiator for curing the mixture.

19 Claims, No Drawings

US 6,262,205 B1

RADICAL-POLYMERIZABLE MULTICOMPONENT MIXTURES STORABLE IN THE ABSENCE OF AIR AND THEIR USE

BACKGROUND OF THE INVENTION

1. Field of the Invention

This invention relates to new moldable, radical-polymerizable multicomponent mixtures which are used, for example, as free-flowing or spreadable compositions or as pastes and which subsequently cure under ambient conditions with initiation of the polymerization reaction at room temperature and/or elevated temperatures. In applicational terms, the invention covers almost all fields involving the use of radical-polymerizable or curable compositions, including for example adhesives, sealing compounds, the selective production of plastic moldings, surface-coating with air-curing and, in particular, solventless lacquer systems and the like.

2. Discussion of Related Art

The peroxide- or hydroperoxide-initiated curing of olefinically unsaturated systems requires selected starters or activator systems particularly when the reaction is to be initiated at low temperatures, for example at room temperature or only slightly elevated temperatures. For example, it is known that a corresponding activating function is performed by selected tertiary amine compounds with partly aromatic substitution at the nitrogen atom. Known activators for the initiation of polymerization reactions, for example with dibenzoyl peroxide, are in particular dimethyl aniline and dimethyl p-toluidine.

A totally different known class of activators for the oxidative polymerization initiation of certain unsaturated systems, namely drying oils, are metal compounds—at least partly soluble in the system—of metals which can occur in several valency stages and which accelerate the starting reaction through intermediate shifts in valency on interaction with other components of this system. These metal compounds, which are sufficiently soluble in organic solvents and/or in binders, have been known for some time as so-called drying agents for the air drying of paints, varnishes and the like based on unsaturated oils. Sufficiently oil-soluble compounds of transition metals which are capable of occurring in several valency stages are particularly suitable for this purpose. The individual components differ in their ability to accelerate curing. Compounds of cobalt and/or manganese are mainly used for this purpose, although iron also accelerates curing. Comparable compounds of other metals which are also capable of occurring in several valency stages may be used in addition to and, in particular, in combination with these highly effective metal components. A detailed description of such systems can be found, for example, in Ullmann, "Encyklopädie der technischen Chemie", 4th Edition, Vol. 23 (1983), 421 to 424.

U.S. Pat. Nos. 4,010,152 and 4,063,012 describe the (co)polymerization of ethylenically unsaturated monomers, such as vinyl chloride, with selected aliphatic α-(hydroperoxy)-azo compounds or salts thereof which, according to the structural formula provided, may be assigned to the class of hydrazone derivatives and may be regarded as selected hydrazone peroxides. According to the teaching of the first of these two documents, they are prepared by reaction of α-halogen-azo compounds with sodium peroxide or hydrogen peroxide in the presence of acid acceptors and are then said to be used as polymerization initiators. Most of the Examples of this document and of the parallel, second US document mentioned describe the production of the hydroperoxide compounds by a method which is not explained in detail in the general disclosure of the invention. The selected hydrazone compounds in solution in a solvent are treated with a stream of oxygen by passing the oxygen through the solution of the hydrazone compounds kept at room temperature or at slightly elevated temperatures. The particular hydroperoxides are obtained in high yields of 80% or more and are optionally purified by low-temperature crystallization. The hydroperoxides may be used as starter systems for the polymerization of, for example, vinyl chloride or unsaturated polyester styrene resins.

A number of earlier publications are concerned with compounds of this type and their formation, particularly by autoxidation. As long ago as 1914, M. Busch et al. described the autoxidation of hydrazones in Ber. 47 (1914), 3277 to 3291. The alleged formation of the peroxides is postulated here as the addition of 1 molecule of oxygen onto the C:N double bond of the hydrazone with formation of a four-membered peroxide ring. The autoxidation of phenyl hydrazones is described again in K. H. Pausacker, J. Chem. Soc. 1950, 3478 to 3481. This publication reports on the non-catalyzed reaction of pure phenyl hydrazones and the corresponding reactions in the presence of a small quantity of benzoyl peroxide as catalyzed reactions. Further structural elucidation of the constitution of hydrazone peroxides is provided by R. Criegee et al. in Ber. 84 (1951), 219 to 224. It is shown here that the hydrazone peroxides can only be formed—at least at room temperature or correspondingly low temperatures—from derivatives of hydrazine compounds which contain a hydrogen atom at the substituted nitrogen atom.

The problem addressed by the present invention was to develop on the basis of existing knowledge new possibilities for the practical application of starters or activators and activator systems of the type in question which could be used in a simplified manner to initiate the polymerization of olefinically unsaturated systems. In admixture with radical-polymerizable substances or mixtures of the type used in practice, the activators would be inherently capable of activation by contact with ambient air. In preferred embodiments, this activation would actually take place at room temperature, although provision would be made for an increase in temperature where necessary. A particularly important aspect of the invention concerns multicomponent mixtures of the type mentioned which would be capable, simply by contact with ambient air at room temperature, of initiating the starting reaction of a radical polymerization of unsaturated systems with time-controlled curing and a predetermined pot life. In one important embodiment, the invention seeks in particular to provide one-component storable systems which would be moldable, more particularly paste-like to free-flowing, in their application form and which would have a sufficiently long pot life for processing, but would then cure in dimensionally stable form by simple exposure to ambient air.

DESCRIPTION OF THE INVENTION

Other than in the operating examples, or where otherwise indicated, all numbers expressing quantities of ingredients or reaction conditions used herein are to be understood as modified in all instances by the term "about"In a first embodiment, therefore, the present invention relates to the use of alkyl, cycloalkyl and/or aryl hydrazones of aliphatic, cycloaliphatic and/or aromatic aldehydes and/or ketones, which are capable of forming hydroperoxides and which are present in admixture with radical-polymerizable systems based on olefinically unsaturated compounds, as starters or as the principal component of starter systems for the curing of olefinically unsaturated compounds by radical polymerization with ambient air. The hydrazones mentioned are derived from hydrazine derivatives which contain a hydrogen atom at the substituted nitrogen atom. In the interests of simplicity, they are also referred to hereinafter as "hydrazone compounds".

In this first embodiment of the invention, the hydrazone compounds are preferably used together with metal compounds at least partly soluble in the system for accelerating the drying of unsaturated oils and/or, together with reducing agents having an accelerating effect, for radical polymerization and, more particularly, for the time-controlled curing—in conjunction with a predetermined pot life—with ambient air at room temperature and/or elevated temperatures of moldable multicomponent mixtures, preferably in the course of their molding, which contain the radical-polymerizable olefinically unsaturated components, if desired together with dissolved and/or undissolved fillers and/or auxiliaries.

In a second embodiment, the present invention relates to moldable radical-polymerizable multicomponent mixtures containing ethylenically unsaturated polymerizable compounds, if desired in admixture with soluble and/or insoluble fillers and/or other auxiliaries and oxygen-initiated starters of activators or activator systems, characterized in that, in their application form, these multicomponent mixtures are present as at least slightly thickened material and contain starters based on the principal components above which are capable of initiation by contact with oxygen and, in particular, by contact with ambient air.

The invention is based on the observation that, taking into account the elements described in detail in the following, it is possible to create additional degrees of freedom in the practical application of radical-polymerizable systems. The starter system is activated by simple exposure to air at ambient temperature or elevated temperatures, thus initiating the reaction in the system as a whole for dimensionally stable curing. The open time of the system required for molding may largely be freely selected. Accordingly, practical significance in the broadest applicational sense is attributed to multicomponent systems having the composition according to the invention.

The hydrazone compounds and the other principal components of the activator systems preferably used in accordance with the invention are described in detail in the following.

Hydrazone compounds

The hydrazone components preferably used in accordance with the invention correspond to general formula I:

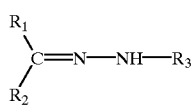

(I)

In this embodiment, the substituents $R_1$, $R_2$ and $R_3$ in general formula (I) have the following meanings:

$R_1$ is a linear, branched or cyclic and optionally substituted alkyl radical or an optionally substituted aryl radical.

$R_2$, which may be the same as or different from the substituent $R_1$, is hydrogen, a linear, branched or cyclic and optionally substituted alkyl radical or an optionally substituted aryl radical.

In one particular embodiment, the substituents $R_1$ and $R_2$ together with the common substituted carbon atom, may also form a cycloaliphatic radical which may even be substituted.

The substituent $R_3$ is again a linear, branched or cyclic and optionally substituted alkyl radical or an optionally substituted aryl radical.

The substituents $R_1$, $R_2$ and $R_3$ may be completely or at least partly the same, although each of these substituents may also differ in its structure from the other two substituents. The alkyl radicals are, in particular, linear and/or branched alkyl radicals containing up to 40 carbon atoms and preferably up to about 20 carbon atoms. Cyclic substituents are determined in their minimum number of carbon atoms by the stability of the particular ring system. A preferred lower limit is 5 carbon atoms and, more particularly, 6 carbon atoms.

The substituents $R_1$, $R_2$ and $R_3$ may be unsubstituted or substituted. It is important in this regard to bear in mind the fact that the reactivity of the activator system can be influenced to a certain extent by substitution of these substituents and, in particular, the substituent $R_3$. For example, if an aromatic system, particularly a phenyl radical, is present as the substituent $R_3$, it is possible by suitable substitution of this phenyl radical to accelerate the reaction by the provision of electron-repelling substituents known per se at this phenyl radical in $R_3$. The relevant prior art literature cited above contains clear references to this, cf. for example the literature reference Pausacker loc. cit. page 3480, Table. Electron-repelling and, hence, reaction-accelerating substituents are, for example, alkyl, alkoxy and/or halogen substituents at the phenyl radical in $R_3$; conversely, strongly electron-attracting substituents like the —$NO_2$ group have a decelerating effect on the reaction. Extensive general specialist knowledge exists on these electron-repelling or electron-attracting effects by substitution and on the structure of the particular substituents.

The substituents $R_1$ and $R_2$ in general formula I can also influence the speed of the reaction through the choice of their particular constitution and any intended substitution, cf. the relevant literature cited above, more particularly the cited Article by Criegee et al., loc. cit., page 222 and the literature cited in connection with this Table.

The above-cited U.S. Pat. No. 4,010,152 with its formula schemes in columns 6 to 14 illustrates the considerable diversity for the intended constitution of the substituents $R_1$, $R_2$ and $R_3$ from the compounds corresponding to general formula I. This document shows the hydrazone compounds in the form of their hydroperoxides which are also formed in situ on contact with air in accordance with the present invention. The detailed disclosure of the document in question on the intended constitution of the hydrazone compounds or the hydroperoxides formed from them in situ applies to the teaching of the present invention in connection with the definition of the compounds corresponding to general formula I. For reasons of expediency, reference may be made to this detailed printed disclosure in connection with the description of the invention.

Metal compounds at least partly soluble in the system

As already mentioned, the most important drying agents of the type in question are distinguished by the fact that, above all, metal compounds of metals capable of occurring in several valency stages are used. Selected representatives of the transition metals can be particularly active in this regard. A velocity-determining character for initiating polymerization may be attributed inter alia to the choice of the particular metal. Components highly active at room temperature are derived, for example, from copper, cobalt, vanadium and/or manganese. However, particular significance and a good reaction-accelerating effect are attributed to compounds of iron.

Iron, cobalt and/or manganese compounds, optionally in admixture with other metal components, such as compounds of lead, cerium, calcium, barium, zinc and/or zirconium, are particularly suitable for working at room temperature which is particularly advantageous for many applications. The relevant specialist literature may be consulted in this regard, cf. for example the cited publication in Ullmann, loc. cit., and the literature cited therein.

The metals in question are used in the form of such compounds that they are at least partly soluble in the system as a whole. Both soap-like metal compounds and metal compounds attached otherwise, particularly by complexing, to organic radicals may be used. Corresponding metal naphthenates or metal acetyl acetonates may typically be used in accordance with the teaching of the present invention. However, if inorganic salts are sufficiently soluble in the system, inorganic systems such as these may also be used. A typical example of this is iron chloride which shows a distinct accelerating effect when used in the system according to the invention.

It may be advisable to use the metal compounds in a low valency stage of the metal, i.e. for example as cobalt (II) or manganese (II). In other cases, it is also suitable to use the metal compound in the higher valency stage of the metal. For example, iron may even be used in the form of $Fe^{3+}$ compounds.

Reducing agents with an accelerating effect

The activator components in question, which are optionally used in accordance with the invention, are any of the various mixture components having a reducing effect which are used in typical redox systems for initiating polymerization reactions, cf. the relevant extensive literature, for example W. Kern, Makromol. Chem. 1, 249 (1947), C. Srna, Angew. Makromol. Chem. 9, 165 (1969) and, more generally, Houben-Weyl "Methoden der organischen Chemie", Vol. 14/1, 263 to 297.

The class of α-hydroxyketones as represented, for example, by butyroin, benzoin or acetoin has proved to be particularly active in this regard, although the teaching of the invention is by no means confined to α-hydroxyketones, cf. the modifications illustrated in the Examples according to the invention. Compounds of this class are capable of performing an important reaction-accelerating function in the activator systems used in accordance with the invention, although their use is not essential.

Starters or activator systems of the principal component in question, namely hydrazone compound, at least partly soluble metallic drying agent and/or, optionally, accelerator, are all capable after absorbing ambient air of initiating the radical-polymerizable, olefinically unsaturated systems which, hitherto, have been used with various, more particularly peroxidic, starter systems. Definitions of the other constituents of the moldable, radical-polymerizable multicomponent mixtures according to the invention can be found in the extensive relevant literature concerned with the production and processing of systems based on olefinically unsaturated, radical-polymerizable compounds. An extremely large number of systems of this type tailored in their properties to the particular application is currently available in the specialist field in question. Olefinically unsaturated reactive systems can be built up on the basis of selected radical-polymerizable, ethylenically unsaturated compounds or on the basis of mixtures of several types of such compounds. The ethylenically unsaturated polymerizable components may be monofunctional compounds and/or polyfunctional reactive components.

Systems which are distinguished by at least slightly increased viscosity values at the onset of the polymerization reaction are particularly suitable for the initiation of polymerization by means of the atmospheric oxygen activated in accordance with the invention, particularly at room temperature or at elevated temperatures. Tests have in fact shown that, even where a basically highly active combination of activators is used, the use of ambient air does not lead to initiation of the reaction, or at least not in the required time, when highly mobile unsaturated systems are employed, even where they are known per se for their high reactivity in the polymerization reaction. Typical examples of such systems are conventionally stabilized lower acrylate esters, methacrylate esters or styrene.

In general terms, therefore, radical-polymerizable systems having an initial viscosity of at least about 30 to 100 mPa.s and preferably of at least about 200 or 300 mPa.s should be used in accordance with the invention. Particularly safe activation of the polymerization reaction can be expected in the case of systems having an initial viscosity of at least about 500 mPa.s and, more particularly, of at least about 1,000 mPa.s. All these viscosity values are determined as Brookfield viscosities. Commercial adhesive systems are known to have viscosities of at least about 3,000 mPa.s and, more particularly, in the range up to about 10,000 mPa.s. Materials of this type are, understandably, eminently suitable for processing in accordance with the invention, although the invention is by no means limited to such materials. Systems of considerably lower viscosity, for example spreadable paint systems used in particular as solventless systems are also suitable for the reaction initiation mechanism described herein providing the above-mentioned minimum values are observed for the initial viscosity of the material to be processed by shaping. The same applies to other applications, for example the production of plastic moldings based on styrene/unsaturated polyester resins.

The necessary initial viscosity values may be established in particular by mixtures having a sufficient content of oligomeric and/or polymeric components, optionally in admixture with low molecular weight unsaturated components liquid at room temperature, such as (meth)acrylates. However, correspondingly viscous compositions may also consist solely of precondensates having suitable flow properties. The extensive knowledge of experts on such ethylenically unsaturated mixtures curable by radical polymerization is of particular relevance in this regard.

The multicomponent mixtures used in accordance with the invention are generally formulated as one-component systems which are protected against contact with air pending their use. However, they may also be formulated as multicomponent systems. For the practical application of the system, the components are subsequently mixed together. The open pot life of the system may be regulated by suitable choice and adaptation of the principal components of the activator system so that in this case, too, the starting reaction can be initiated and, hence, the system ultimately cured in air under ambient conditions. In one embodiment of the invention, the multicomponent mixtures in question of activator system and polymerizable components are present as two-component systems which do not react, even on exposure to air. It is particularly preferred in this case to separate the principal components of the activator systems used in accordance with the invention from one another in such a way that the hydrazone compound is kept separate from the metal compounds. Both components may thus generally contain ethylenically unsaturated reaction mixture. For processing, these two separately stored components merely have to be mixed, shaped during the open pot life of the system and exposed to the ambient air.

The invention enables optimized mixtures of active substances to be formulated. Keeping to the basic principles of the invention, soluble and/or insoluble fillers, elasticizing agents, thickeners, thixotropic agents, pigments, coupling agents, stabilizers and the like may be used without in any way endangering the effectiveness of the activator system according to the invention. This does of course presuppose that disturbances to the interaction of the activator components are ruled out through the selection of suitable auxiliaries and fillers. General chemical knowledge may be applied in this regard.

In the multicomponent mixtures according to the invention, the activator mixtures preferably make up no more than about 15% by weight and, in particular, no more than about 10% by weight, based on the total weight of the system as a whole. Depending on the activity of the components used, the weight of the activator mixture can be reduced very considerably, for example to around 0.1% by weight or to at least about 0.5% by weight. Quantities of the activator system of at least about 1% by weight and, preferably, up to about 8% by weight can be particularly suitable. All these figures are based on the one hand on the total weight of the multicomponent system according to the invention and the total weight of the three principal components of the activator system.

The three above-mentioned components of the activator system may preferably be used in the following quantities (in % by weight, based on the system as a whole):

hydrazone compounds: at least about 0.1% by weight, best 0.5 to 7.5% by weight and preferably 1 to 4% by weight metal of soluble metal compound: 0 to a few % by weight, best about 50 ppm to 1% by weight and preferably more than 100 ppm, for example 1,000 to 5,000 ppm reducing agent: 0 to 5% by weight and preferably 1 to 35 by weight Inhibitors and/or stabilizers against premature initiation of the radical reaction may be used in known manner to control the reaction and/or the open pot life. The quantities in which they are used are governed by the stated purpose and, in each individual case, may readily be determined by expert considerations and/or by preliminary tests. The regulators used will generally not exceed a few percent, for example about 2 to 5% by weight, of the mixture as a whole and are generally used in quantities of less than 1% by weight.

Several mechanisms are available in known manner for inhibiting the systems according to the invention. The following two basic types are mentioned:

1. stabilization against $O_2$, addition of antioxidants and
2. stabilization against radicals, addition of radical inhibitors Typical stabilizer components are listed in the following from general chemical knowledge, the mechanism to which the stabilizer is to be assigned being indicated in brackets after the particular compound: pyrogallol (1), $O_2$-inhibited acrylates (1), hydroquinone (1,2), hydroquinone monomethyl ether (1,2), butyl hydroxytoluene (2) and phenothiazine (2). Particular significance for stabilizing the system against unwanted premature reaction can be attributed to compounds of the triphenyl phosphine type.

Mixtures of oligomers and polymers with ethylenically unsaturated monomers of low molecular weight are used as the multiple-purpose mixtures of radical-polymerizable compounds typically used in practice. The mixture components of relatively high molecular weight are often at least partly soluble in the monomers. Mixtures of this type are particularly suitable for processing in accordance with the invention. The content of monomers, for example of the (meth)acrylate, optionally substituted styrene and/or acrylonitrile type, is generally at least 10% by weight and preferably at least about 20% by weight and, in many applications, can make up at least about 40% by weight, based on the reactive mixture as a whole. The monomer component may be by far the predominant component by weight, so that, for example, 60 to 80% by weight of the mixture as a whole is formed by the low molecular weight monomer. As mentioned above, however, it is important in this regard to ensure that the at least slightly increased initial viscosity of the mixtures required for safely initiating the reaction on contact with air is guaranteed by the use of a sufficient quantity of compounds of relatively high molecular weight and/or by other thickeners.

In characteristic applications, which fall within the scope of the invention as preferred embodiments, these conditions are guaranteed in any event. Without any claim to completeness, the following examples are mentioned here: aerobic adhesive systems, spreadable compositions for surface coating with polymerizable, more particularly solventless, lacquers and paints in the form of spreadable air-drying lacquer systems and the production of moldings with reaction initiation by contact with ambient air, for example based on styrene/unsaturated polyester resins.

EXAMPLES

For the following Examples, the ethylenically unsaturated compounds (also referred to hereinafter as monomers) were freed from any inhibitors present and, as far as possible, purified by distillation. In the case of low-volatility, non-distillable monomers, dissolved oxygen was removed by evacuation and subsequently passing nitrogen through for several hours. The monomers were stored in an inert gas atmosphere (nitrogen or argon) and removed.

The hydrazones were prepared by methods known from the literature (see, for example, Houben-Weyl, "Methoden der organischen Chemie", Vol. X/2), stored in an inert gas atmosphere and removed.

To determine the cure time of the polymerizable multi-component mixtures, 100 mg of the mixture formulated in an inert gas atmosphere were exposed to ambient air in a watch glass. The mixture is cured when the entire sample has been converted into a solid thermoplastic or thermoset.

For bonding, test specimens according to DIN 53 281 were coated with the polymerizable mixture and, before fitting together, were exposed to ambient air for a certain time (90 to 600 seconds).

Tensile shear testing is carried out in accordance with DIN 53 283 on single-cut overlapped (250 $mm^2$) specimens.

Example 1

5.5 Parts by weight methyl methacrylate (MMA) are introduced into a nitrogen-filled multiple-neck flask and 4.5 parts by weight Plexigum MG 319 (a polyacrylate manufactured by Röhm) were dissolved therein. 0.13 Part by weight iron acetyl acetonate (Fe(acac)$_3$), 0.2 part by weight butyroin, 0.1 part by weight triphenyl phosphine, 0.5 part by weight JPA 514 (mono-methacryloyloxyethyl phosphate manufactured by Johoka Chemical Corp. Ltd.) and 0.3 part by weight acetone phenyl hydrazone are then added in the absence of oxygen. The homogenized mixture is cooled to −196° C., the flask is evacuated and is then heated to room temperature. Residual oxygen is removed from the system by repeating this freezing/thawing cycle several times. The mixture is then stored in an inert gas atmosphere.

Airing time: 90 seconds

Cure time: 55 mins.

Tensile shear strengths:

Fe bonds: 23 N/mm$^2$

PVC bonds: 5.6 N/mm$^2$ (material failure=MF)

Example 2

A mixture of 15 parts by weight ethylene glycol dimethacrylate
    7.5 parts by weight polyacrylate (Plexigum MB 319, a product of Rohm)
    0.45 part by weight butyroin
    0.3 part by weight iron acetyl acetonate (Fe(acac)$_3$)
    0.68 part by weight acetone phenyl hydrazone is used. The mixture components of this Example and the following Examples are mixed as described in Example 1. The airing time is 90 seconds. Curing begins after 60 minutes on contact with atmospheric oxygen.

Examples 3 to 7

A mixture of 5.5 parts by weight MMA (methyl methacrylate)
    4.5 parts by weight Plexigum MB 319
    0.25 part by weight methacrylic acid
    0.3 part by weight acetone phenyl hydrazone
    0.13 part by weight Fe(acac)$_3$ is used. Various reducing agents are added. These reducing agents, the quantity added and the cure time are shown in the following Table:

| Reducing agent | (parts by weight) | Cure time |
| --- | --- | --- |
| Sodium sulfinate* | 0.25 | 80 minutes |
| o-Benzosulfimide | 0.26 | 70 minutes |
| Ascorbic acid* | 0.25 | 45 minutes |
| SH-terminated PUR | 0.2 | 180 minutes |
| Triethyl phosphite | 0.23 | 120 minutes |

*Not completely dissolved

Examples 8 to 10

A mixture of 5.5 parts by weight MMA (methyl methacrylate)
    4.5 parts by weight Plexigum MB 319
    0.3 part by weight acetone phenyl hydrazone
    0.13 part by weight Fe(acac)$_3$ is used. Various reducing agents are added. These reducing agents, the quantity added and the cure time are shown in the following Table:

| Reducing agent | (parts by weight) | Cure time |
| --- | --- | --- |
| Butyroin | 0.2 | 30 minutes |
| Benzoin | 0.2 | 90 minutes |
| Acetoin | 0.2 | 72 minutes |

Examples 11 to 15

A mixture of 5.5 parts by weight MMA (methyl methacrylate)
    4.5 parts by weight Plexigum MB 319
    0.2 part by weight butyroin
    0.3 part by weight acetone phenyl hydrazone is used. Various metal compounds are added to this basic formulation:

Cu octoate (500, 1,000 and 2,000 ppm Cu)

Cure time: 75 minutes

Co octoate 1,000 ppm Co
    Mn octoate 2,000 ppm Mn     cure overnight
    Mn (acac)$_2$ 2,000 ppm
    Ferrocene 2,000 ppm Fe

Example 16

A mixture of 5.5 parts by weight MMA (methyl methacrylate)
    4.5 parts by weight Plexigum MB 319
    0.3 part by weight acetone phenyl hydrazone
    0.02 part by weight vanadium accelerator VN-2 of Akzo (in tributyl phosphite)

is used. Cure time: 2 hours.

Examples 17 to 19

A mixture of 0.13 part by weight Fe(acac)$_3$
    0.3 part by weight acetone phenyl hydrazone
    0.2 part by weight butyroin
    10 parts by weight monomer mixture (see following Table)

is used.

| Monomer mixture | Cure time |
|---|---|
| Triethylene glycol dimethacrylate Plexigum MB 319 7:3 | 60 minutes |
| Cyclohexyl methacrylate Plexigum MB 319 7:3 | 120 minutes |
| Phenoxyethyl methacrylate Plexigum MB 319 7:3 | 120 minutes |

Examples 20 to 22

A mixture of 0.13 part by weight Fe(acac)$_3$
0.3 part by weight phenyl hydrazone (see Table)
0.2 part by weight butyroin
5.5 parts by weight MMA
4.5 parts by weight Plexigum MB 319 is used. Three different phenyl hydrazones are used in this mixture and the respective cure times are determined:

| Phenyl hydrazone of | Cure time |
|---|---|
| Methyl ethyl ketone | 40 minutes |
| Cyclohexanone | 15 minutes |
| Acetophenone | 60 minutes |

Example 23

16.7 parts by weight MMA
3.3 parts by weight Plexidon M 449 (PMMA, Röhm)
0.5 part by weight saccharin
0.6 part by weight acetone phenyl hydrazone
0.03 part by weight triphenyl phosphine
are mixed as in Example 1.
Airing time: 90 secs.
Cure time: 60 mins.

Tensile shear strength (PVC bond): 6.2 N/mm$^2$ (MF)

Example 24

19 parts by weight MMA
3.3 parts by weight Plexidon M 449 (PMMA, Röhm)
0.26 part by weight Fe(acac)$_3$
0.4 part by weight butyroin
0.6 part by weight p-methoxyphenyl hydrazone
are mixed as in Example 1.
Airing time: 90 secs.
Cure time: 45 mins.

Tensile shear strength (PVC bond): 11 N/mm$^2$ (MF)

Example 25

16.7 parts by weight MMA
3.3 parts by weight Plexidon M 449 (PMMA, Röhm)
0.03 part by weight triphenyl phosphine
0.6 part by weight acetone phenyl hydrazone
are mixed as in Example 1.
Airing time: 90 secs.
Cure time: 90 mins.

Tensile shear strength (PVC bond): 6 N/mm$^2$ (MF)

Example 26

16 parts by weight MMA
6.2 parts by weight Hypalon 20 (chlorosulfonated polyethylene, DuPont)
0.4 part by weight butyroin
0.3 part by weight Fe(acac)$_3$
0.6 part by weight acetone phenyl hydrazone
are mixed as in Example 1.
Airing time: 90 secs.
Cure time: 60 mins.

Tensile shear strength (PVC bond): 5.3 N/mm$^2$ (MF)

Example 27

5.5 parts by weight MMA
4.5 parts by weight Plexigum MB 319
6.2 parts by weight butyroin
0.13 part by weight Fe(acac)$_3$
0.3 part by weight acetone t-butyl hydrazone
are mixed as in Example 1.
Airing time: 90 secs.
Cure time: 33 mins.

Tensile shear strength (PVC bond): 6.9 N/mm$^2$ (MF)

Example 28

20 parts by weight tetrahydrofurfuryl methacrylate
10 parts by weight Plexigum MB 319
0.6 part by weight butyroin
0.4 part by weight Fe(acac)$_3$
0.08 part by weight triphenyl phosphine
0.9 part by weight acetone phenyl hydrazone
are mixed as in Example 1.
Airing time: 19 secs.
Cure time: 90 mins.

Tensile shear strength (PVC bond): 5.7 N/mm$^2$ (MF)

What is claimed is:

1. A process of curing an olefinically-unsaturated compound selected from the group consisting of acrylates, methacrylates, styrenes, and acrylonitriles, comprising forming a mixture of said olefinically-unsaturated compound with an alkyl, cycloalkyl or aryl hydrazone of an aliphatic, cycloaliphatic or aromatic aldehyde or ketone, a metal compound which is at least partly soluble in said mixture and a reducing agent wherein the metal compound and the reducing agent form a redox system in the mixture and exposing said mixture to oxygen.

2. A process as in claim 1 wherein said mixture is in the form of a free-flowing or slightly thickened, spreadable paste-like material.

3. A process as in claim 1 wherein said mixture has a Brookfield viscosity of at least about 30 to about 100 mPa.s.

4. A process as in claim 1 wherein said hydrazone corresponds to formula I

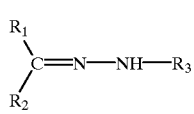

(I)

wherein the substituents $R_1$, $R_2$ and $R_3$ are at least partly the same or different and $R_1$ represents a linear, branched or cyclic and optionally substituted alkyl radical or an optionally substituted aryl radical, $R_2$ may be hydrogen, a linear, branched or cyclic and optionally substituted alkyl radical or an optionally substituted aryl radical; and $R_3$ represents a linear, branched or cyclic and optionally substituted alkyl radical or an optionally substituted aryl radical.

5. A process as in claim 1 wherein said metal compound is selected from the group consisting of iron, copper, cobalt and manganese.

6. A process as in claim 1 wherein said hydrazone is present in an amount of from about 0.1 to about 7.5% by weight, based on the weight of said mixture.

7. A process as in claim 1 wherein said metal compound is present in an amount of from about 50 ppm to about 1% by weight, and said reducing agent is present in an amount of from about 1 to about 3% by weight, based on the weight of said mixture.

8. A process as in claim 1 wherein said reducing agent consists of an α-hydroxyketone.

9. A process as in claim 1 wherein said mixture contains a filler, thickener, plasticizer, pigment, coupling agent, or stabilizer.

10. A process as in claim 1 wherein said mixture contains an antioxidant or radical inhibitor to stabilize said mixture against premature contact with oxygen or to regulate the pot life of said mixture.

11. A process as in claim 1 wherein said olefinically-unsaturated compound is present in an amount of from about 20 to about 40% by weight, based on the weight of said mixture.

12. A process as in claim 1 wherein said mixture comprises a reactive adhesive which is curable by contact with oxygen, said reactive adhesive containing an acrylate or methacrylate-based component in admixture with a polymer which is at least partly soluble therein, said reactive adhesive having a viscosity of from about 3,000 to about 10,000 mPa.s.

13. A process as in claim 1 wherein said mixture comprises an air-curing lacquer or a plastic molding composition.

14. A moldable, radical-polymerizable multicomponent mixture comprising an olefinically-unsaturated compound selected from the group consisting of acrylates, methacrylates, styrenes, and acrylonitriles, and an activator system which is activated by contact with oxygen, said activator system comprising a hydrazone compound of an aliphatic, cycloaliphatic or aromatic aldehyde or ketone, a metal compound which is at least partly soluble in said mixture and a reducing agent having an accelerating effect for the radical initiation of a polymerizing reaction wherein the metal compound and the reducing agent form a redox system therein.

15. A mixture as in claim 14 having a minimum Brookfield viscosity of about 100 mPa.s.

16. A mixture as in claim 14 wherein said hydrazone corresponds to formula I

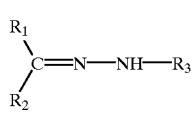

(I)

wherein the substituents $R_1$, $R_2$ and $R_3$ are at least partly the same or different and $R_1$ represents a linear, branched or cyclic and optionally substituted alkyl radical or an optionally substituted aryl radical; $R_2$ may be hydrogen, a linear, branched or cyclic and optionally substituted alkyl radical or an optionally substituted aryl radical; and $R_3$ represents a linear, branched or cyclic and optionally substituted alkyl radical or an optionally substituted aryl radical.

17. A mixture as in claim 14 wherein said hydrazone is present in an amount of from about 0.1 to about 7.5% by weight, based on the weight of said mixture.

18. The mixture of claim 14 wherein the multicomponent mixture is present in at least slightly thickened condition.

19. The mixture of claim 14 wherein the reducing agent is an α-hydroxyketone.

* * * * *